United States Patent
Kurian et al.

(10) Patent No.: US 6,331,264 B1
(45) Date of Patent: Dec. 18, 2001

(54) LOW EMISSION POLYMER COMPOSITIONS

(75) Inventors: Joseph Varapadavil Kurian, Newark, DE (US); Jing Chung Chang, Columbia, SC (US)

(73) Assignee: E. I. Du Pont De Nemours and Company, Wilmington, DE (US)

(*) Notice: Subject to any disclaimer, the term of this patent is extended or adjusted under 35 U.S.C. 154(b) by 0 days.

(21) Appl. No.: 09/505,785

(22) Filed: Feb. 17, 2000

Related U.S. Application Data

(60) Provisional application No. 60/127,080, filed on Mar. 31, 1999.

(51) Int. Cl.$^7$ .............................. C08L 67/02; D01D 5/10
(52) U.S. Cl. .............. 264/172.17; 264/165; 264/172.18; 525/425; 525/437
(58) Field of Search ................... 525/425, 437; 264/172.17, 172.18, 165

(56) References Cited

U.S. PATENT DOCUMENTS

| | | | |
|---|---|---|---|
| 3,462,477 | 8/1969 | Caporali et al. | 260/465.3 |
| 3,801,530 * | 4/1974 | Freed | 524/222 |
| 3,893,895 | 7/1975 | Dehnert et al. | 203/59 |
| 3,903,042 * | 9/1975 | Gall | 524/538 |
| 3,923,648 | 12/1975 | Lashley, Jr. | 210/12 |
| 4,008,199 | 2/1977 | Gall | 260/40 R |
| 4,081,591 | 3/1978 | Takiyama et al. | 526/217 |
| 4,251,652 | 2/1981 | Tanaka et al. | 528/279 |
| 4,891,406 | 1/1990 | Bittscheidt et al. | 525/64 |
| 4,937,314 | 6/1990 | Greene | 528/272 |
| 5,194,517 | 3/1993 | Blubaugh et al. | 525/396 |
| 5,229,172 | 7/1993 | Cahalan et al. | 427/536 |
| 5,334,778 | 8/1994 | Haas et al. | 568/862 |
| 5,364,984 | 11/1994 | Arntz et al. | 568/862 |
| 5,459,229 | 10/1995 | Kelsey | 528/275 |
| 5,606,094 | 2/1997 | Roof et al. | 558/463 |
| 5,612,417 | 3/1997 | Rhein et al. | 525/221 |
| 5,693,808 | 12/1997 | Lnghals | 546/37 |
| 5,798,433 | 8/1998 | Schmidt et al. | 528/279 |
| 6,093,786 | 7/2000 | Kelsey | 528/271 |

FOREIGN PATENT DOCUMENTS

| | | |
|---|---|---|
| 42 21 969 A1 | 1/1994 | (DE) . |
| 110 861 | 7/1986 | (EP) . |
| 547 553 | 6/1993 | (EP) . |
| 0 697 219 A2 | 2/1996 | (EP) . |
| 812 337 B1 | 12/1997 | (EP) . |
| 0 857 709 A1 | 8/1998 | (EP) . |
| 1 006 220 A1 | 6/2000 | (EP) . |
| 1 431 511 | 4/1976 | (GB) . |
| 2 114 118 | 8/1983 | (GB) . |
| 55-13205 | 6/1978 | (JP) . |
| 57-21358 | 7/1980 | (JP) . |
| 01-094994 | 4/1989 | (JP) . |
| 664427 | 10/1993 | (SU) . |
| 98/23662 | 6/1998 | (WO) . |
| 98/57913 | 12/1998 | (WO) . |
| 00/14041 | 3/2000 | (WO) . |
| 00/17265 | 3/2000 | (WO) . |

OTHER PUBLICATIONS

Degussa, "Poly–1,3–propyleneterephthalate (PPT)—A New Polyester Fiber Raw Material" (1994).
English Abstract of DE 3241198A, published Aug. 4, 1983, corresponding to GB 2114118A, published Aug. 17, 1983.
English Abstract of JP 55013205A, published Jan. 30, 1980.
English Abstract of JP 01042939 B4, published Sep. 18, 1989.
Encyclopedia of Polymer Science and Technology, John Wiley & Sons, Inc. 1964, vol. 1, p. 173.
Kirk–Othmer Encyclopedia of Chemical Technology, Third Edition, John Wiley & Sons, Inc. 1978, vol. 1, p. 290.
Traub, Synthesis and Textile Chemical Properties of Polytrimethyleneterephthalate (Dissertation) (Translation), Feb. 1994.

\* cited by examiner

*Primary Examiner*—Patricia A. Short
(74) *Attorney, Agent, or Firm*—Nancy S. Mayer; Barbara C. Siegell; Mark D. Kuller

(57) ABSTRACT

The invention comprises polymer compositions containing 3-hydroxypropanoxy terminated polymer that exhibit reduced levels of degradation product emissions during processing, by contacting the polymer in the molten state with a melt stable, organic nitrogen-containing stabilizing compound, such as polyamide.

30 Claims, No Drawings

LOW EMISSION POLYMER COMPOSITIONS

CROSS REFERENCE TO RELATED APPLICATION

This application claims the priority benefit of provisional application No. 60/127,080, filed Mar. 31, 1999.

FIELD OF THE INVENTION

The invention concerns polymer compositions that exhibit reduced levels of degradation product emissions during processing. This invention further concerns processes for the fabrication of polymer articles with low emissions of polymer degradation products.

TECHNICAL BACKGROUND

3-Hydroxypropanoxy terminated polymers have the problem of being prone to thermal degradation processes that result in acrolein emissions. Acrolein is an irritant chemical, for which workplace levels are strictly regulated, i.e. to limit its content in the air to be less than 0.1 ppm [AEL].

SUMMARY OF THE INVENTION

The present invention solves this problem by providing compositions comprising 3-hydroxypropanoxy terminated polymers of improved stability with regard to acrolein emission. The present invention comprises compositions prepared by contacting molten 3-hydroxypropanoxy terminated polymer with an effective amount of a melt stable, organic nitrogen-containing stabilizing compound to reduce the emission of acrolein from said molten polymer.

This invention also comprises a process for the fabrication of polymer articles from 3-hydroxypropanoxy terminated polymers exhibiting low levels of acrolein emissions, which process comprises:

a) contacting in the molten state said 3-hydroxypropanoxy terminated polymer with an effective amount of a melt stable, organic nitrogen-containing stabilizing compound to reduce the emission of acrolein from said polymer in the molten state, and b) fabricating said polymer into said article.

DETAILED DESCRIPTION OF THE INVENTION

3-Hydroxypropanoxy terminated polymers, i.e., those polymers bearing an end group of the structure —O—$CH_2CH_2CH_2$OH, are prone to degradative processes when molten that result in the generation and emission of acrolein, $CH_2$=CHCHO.

3-Hydroxypropanoxy terminated polymers comprise those polymers prepared from 1,3-propanediol or its chemical equivalents. The 1,3-propanediol can be prepared chemically or biologically. For purpose of this specification the term 3-hydroxypropanoxy terminated polymers includes, but is not limited to 1,3-propanediol dicarboxylate polymer, examples of which include poly(trimethylene terephthalate, poly(trimethylene naphthalenedicarboxylate), poly(trimethylene isophthalate) and blends and copolymers thereof. Other dicarboxylic acids useable in the 3-hydroxypropanoxy terminated polymers include 1,4-cyclohexane dicarboxylic acid, 1,3-cyclohexane dicarboxylic acid, succinic acid, glutaric acid, adipic acid, sebacic acid and 1,1 2-dodecane dioic acid. Depending on the route of synthesis employed in the preparation of the polymers of the present invention, the dicarboxylic acids may be introduced to the polymerization process as the dicarboxylic acids or as the lower dialkyl esters of the dicarboxylic acids, for example, the dimethyl, diethyl, or dipropyl esters of these dicarboxylic acids.

Copolymers useable with the polymers of the present invention typically comprise any of the dicarboxylic acids mentioned above and diols other than 1,3-propanediol, for example, up to 30 mol% of such other diol, based on the total moles of diol present. These diols include ethylene glycol, 1,4-butane diol, 1,2-propanediol, diethylene glycol, triethylene glycol, 1,3-butane diol, 1,5-pentane diol, 1,6-hexane diol, 1,2-, 1,3- and 1,4-cyclohexane dimethanol, and the longer chain diols and polyols made by the reaction product of diols or polyols with alkylene oxides.

When the polymers of the present invention are used in blends, the blend polymer can be prepared from any of the diacids or the diols listed above. A specifically preferred blend comprises poly(ethylene terephthalate) and poly(trimethylene terephthalate).

These polymers have a high molecular weight so as to be commercially useful. Such molecular weight can be characterized by the polymer having an intrinsic viscosity (IV) of at least 0.1 dl/g, determined by measuring the flow time of a solution of known polymer concentration and the flow time of the polymer solvent in a capillary viscometer, as set forth in ASTM D2857.95

The polymer can be a homopolymer or blends and copolymers containing at least 10% of one or more 3-hydroxypropanoxy terminated polymer. For example a blend comprising 90% poly(ethylene terephthalate) and 10% poly(trimethylene terephthalate)—(containing up to 1 weight % of a polyamide polymer as the stabilizing compound), is within the envisioned scope of the present invention.

The melt stable, organic nitrogen-containing stabilizing compound with which the 3-hydroxypropanoxy terminated polymer is intimately blended is selected from melt stable primary, secondary and tertiary amines, either aliphatic or aromatic, and aliphatic or aromatic amides. Also included are polymers containing such functional groups either as a polymer side chain or in the polymer backbone, e.g., polyamides, and copolymers and blends of polyamides.

When polyamides are employed, they can be linear or branched in chain structure. Examples of linear polyamides include, monomeric polyamides, such as poly(caprolactam), nylon 6, and bis monomeric polyamides, such as poly(hexamethylenediamine adipate), nylon 4,6, nylon 6,6, nylon 6,10, nylon 6,12, nylon 12,12, or their copolymers and blends. Certain aromatic polyamides, for example poly(p-phenylene terephthalamide) and poly(m-phenylene isophthalamide), can also be employed. Polyamides prepared from the use of tri-,tetra- or multifunctional amines, e.g., bis(hexamthylenetriamine) or BHMT can also be used.

To reduce the emission of acrolein from the 3-hydroxypropanoxy terminated polymer, it is only necessary that the stabilizing compound contain nitrogen and be stable in the polymer melt. Preferably, the stabilizing compound will also be in the liquid state in the melt of 3-hydroxypropanoxy terminated polymer so as to be intimately mixed with the polymer. Typically, the compound is of sufficient molecular weight so as to achieve stability in molten 3-hydroxypropanoxy terminated polymer, in which case, the liquid state of the compound will be the molten state. The stabilizing should also not introduce or cause color in the polymer. Polyamides such as described above fulfill all of these characteristics and thus are a preferred class of stabilizing compounds.

While not meaning to be bound by any theory, it is believed that the nitrogen functionality in the melt stable, organic nitrogen-containing stabilizing compound either interacts with the 3-hydroxypropanoxy terminus of the polymer chain, or a degradation product thereof, to hinder or stop degradative pathways that generate acrolein or interacts with generated acrolein on the molecular level to hinder or prevent emission. The reactions between amines (primary, secondary, and tertiary) and aldehydes giving different adducts is well documented in literature. For a review of the reactions between amines and aldehydes, See Rec. Chem. Prog., 29, 85–101 (1968).

The amount of melt stable, organic nitrogen-containing stabilizing compound present in the composition of the present invention is defined as an amount to be effective in the reduction of acrolein emission. This is generally less than 10% by weight based on the amount of the 3-hydroxypropanoxy terminated polymer present. One percent by weight has been demonstrated to be effective. The range of effective amounts can be from about 0.01% to about 10% by weight.

Articles of manufacture prepared from 3-hydroxypropanoxy terminated polymers, copolymers and blends can include fibers (monocomponent, bicomponent, for example bicomponent with poly(ethylene terephthalate), or multicomponent), filaments, films, castings and moldings. The manufacture of these articles generally require the starting polymer to be in molten form at some stage of the manufacturing process. It is during this molten stage that acrolein emission is most prevalent.

The composition comprising the 3-hydroxypropanoxy terminated polymer and the melt stable, organic nitrogen-containing stabilizing compound can be formed from the 3-hydroxypropanoxy terminated polymer in flake or pellet form mixed with the melt stable, organic nitrogen-containing stabilizing compound in solid form. The resulting mixture can then be melt processed, i.e., in an extruder, to form the intimate polymer mixture. Alternatively, the melt stable, organic nitrogen-containing stabilizing compound can be introduced into and mixed with a molten stream of 3-hydroxypropanoxy terminated polymer. In the case where a polyamide or copolyamide or polyamide blend is used as the melt stable, organic nitrogen-containing stabilizing compound, this material can be dry blended with the 3-hydroxypropanoxy terminated polymer prior to processing or fed as a melt into a melt of the 3-hydroxypropanoxy terminated polymer. Oligomers containing the nitrogen functionality of the melt stable, organic nitrogen-containing stabilizing compound may also be mixed into a melt of the 3-hydroxypropanoxy terminated polymer. The solid phasing of 3-hydroxypropanoxy terminated oligomers can occur in presence of an oligomeric or polymeric nitrogen containing stabilizing compound In all of these cases, the 3-hydroxypropanoxy terminated polymer and stabilizing compound are in contact with one another when the former is in the molten state. The resultant article fabricated from this melt, such as filament, film or molded article, is then not accompanied by the presence of a detrimental amount of acrolein in the surrounding atmosphere.

In the examples hereafter, spinning tests were conducted in a spinning assembly comprising a conditioning vessel, a screw assembly, a spinning pack comprising a 1050 hole staple spinneret, 39 pounds (17.7 kg) per hour throughput and a polymer residence time about 5 minutes. The screw was shutdown and the conditioner vessel was cleaned before charging each polymer item. Each polymer item was conditioned for 30 minutes using 160° C. recirculating gas before the screw was started up. All samples were taken 30 minutes after the screw system was stable. For the acrolein measurements, NIOSH method NIOSH 2532M was used.

EXAMPLES

Comparative Examples 1 and 2

A sample of poly(trimethylene terephthalate) polymer pellets, prepared via polycondensation of bis(3-hydroxypropyl) terephthalate, having an intrinsic viscosity of 1.02 dl/g, was conducted to a melt spinning apparatus maintained at 274° C. After 30 minutes spinning, air sampling was conducted 4 inches (10.16 cm) below the spinneret and 5 inches (12.7 cm) before the yarn bundle. Samples were taken for 15 minutes (at 1 liter air/minute) and 30 minutes. Results are in the Table 1 as comparative Examples 1 and 2, respectively.

EXAMPLES 1 and 2

Spinning was conducted as in Comparative Example 1 except that the feed to the melt spinning assembly consisted of a physical mixture of 99% (by weight) of poly(trimethylene terephthalate—same batch as above) and 1% by weight of a commercial nylon 6 polymer (40 RV, containing 0.025% $TiO_2$, obtained from Nylmex, Monterrey, Mexico). Data from 15 minute and 30 minute air samples are in Table 1 as Examples 1 and 2, respectively.

EXAMPLES 3 and 4

Spinning was conducted as in Comparative Example 1(and Example 1) except that the feed to the melt spinning assembly consisted of a physical mixture of 95% (by weight) of poly(trimethylene terephthalate—same batch as above) and 5% by weight of a commercial nylon 6 polymer (40 RV, containing 0.025% $TiO_2$, obtained from Nylmex, Monterrey, Mexico). Data from 15 minute and 30 minute air samples are in the Table as Examples 3 and 4, respectively.

TABLE 1

| Example No. | Polymer Temp °C. | Nylon 6 wt % | Sample Volume liters* | Air Sample Acrolein. μg | Conc. Ppm (μg/g) |
|---|---|---|---|---|---|
| Comp. 1 | 274 | 0 | 15 | 4.73 | 0.14 |
| Comp. 2 | 274 | 0 | 30 | 4.98 | 0.07 |
| 1 | 274 | 1 | 15 | <0.50 | <0.01 |
| 2* | 274 | 1 | 30 | <0.50 | <0.01 |
| 3 | 274 | 5 | 15 | <0.50 | <0.01 |
| 4 | 274 | 5 | 30 | <0.50 | <0.01 |

*air sampling rate = 1 liter/min.

These results showed at least about tenfold reduction in acrolein emission occuring during the fabrication of 3-hydroxypropanoxy terminated polymer from the molten state when polyamide was incorporated into the polymer so that it was present in the melt so as to be in contact with the 3-hydroxypropanoxy terminated polymer at the time when acrolein emission would otherwise occur. Similar results can be obtained when other melt stable nitrogen-containing stabilizing compounds are used in place of or in addition to the polyamide.

What is claimed is:
1. A composition for making fibers or films consisting essentially of 3-hydroxypropanoxy terminated polymer and melt stable, organic nitrogen-containing stabilizing polymer in an amount effective to reduce the emission of acrolein from said 3-hydroxypropanoxy terminated polymer while molten.

2. The composition of claim 1 wherein the melt stable, organic nitrogen-containing stabilizing polymer is selected from the group consisting of polymers containing amines or amides either as a polymer side chain or in the polymer backbone.

3. The composition of claim 1 wherein the melt stable, organic nitrogen-containing stabilizing polymer is a polymer containing an amide functional group.

4. The composition of claim 3 wherein the amide functional group is selected from the group consisting of aliphatic or aromatic amides.

5. The composition of claim 1 wherein said 3-hydroxypropanoxy terminated polymer is 1,3-propanediol dicarboxylate.

6. The composition of claim 1 wherein the melt stable, organic nitrogen-containing stabilizing polymer is present in the range of about 0.01% to about 10% by weight of the 3-hydroxypropanoxy terminated polymer.

7. The composition of claim 1 wherein the melt stable, organic nitrogen-containing stabilizing compound is a polymer containing an amine functional group.

8. The composition of claim 7 wherein the amine functional group is selected from the group consisting of aliphatic or aromatic, primary, secondary and tertiary amines.

9. The composition of claim 1 wherein the melt stable, organic nitrogen-containing stabilizing compound is selected from the group consisting of nylon 6, nylon 4,6, nylon 6,6, nylon 6,10, nylon 6,12, nylon 12,12, or their copolymers and blends.

10. The composition of claim 1 wherein the melt stable, organic nitrogen-containing stabilizing compound is selected from the group consisting of poly(p-phenylene terephthalamide) and poly(m-phenylene isophthalamide).

11. The composition of claim 1 wherein the melt stable, organic nitrogen-containing stabilizing compound is a polyamide prepared from bis(hexamthylenetriamine).

12. The composition of claim 1 wherein the 3-hydroxypropanoxy terminated polymer is selected from the group consisting of poly(trimethylene terephthalate), poly(trimethylene naphthalenedicarboxylate), poly(trimethylene isophthalate) and blends and copolymers thereof.

13. The composition of claim 1 wherein the 3-hydroxypropanoxy terminated polymer is poly(trimethylene terephthalate) and copolymers thereof.

14. A process for the preparing fibers from 3-hydroxypropanoxy terminated polymers comprising:
   a) contacting molten 3-hydroxypropanoxy terminated polymer and an effective amount of molten melt stable, organic nitrogen-containing stabilizing polymer to reduce the emission of acrolein from said 3-hydroxypropanoxy terminated polymer in the molten state, and
   b) spinning said 3-hydroxypropanoxy terminated polymer into fibers.

15. The process of claim 14 wherein the melt stable, organic nitrogen-containing stabilizing polymer is selected from the group consisting of polymers containing amines or amides either as a polymer side chain or in the polymer backbone.

16. The process of claim 14 wherein the effective amount of said stabilizing polymer is up to 10 weight percent based on the weight of said 3-hydroxypropanoxy terminated polymer.

17. The process of claim 14 wherein said 3-hydroxypropanoxy terminated polymer is 1,3-propanediol dicarboxylate.

18. The process of claim 14 wherein the melt stable, organic nitrogen-containing stabilizing polymer is present in the range of about 0.01% to about 10% by weight of the 3-hydroxypropanoxy terminated polymer.

19. The process of claim 14 wherein the melt stable, organic nitrogen-containing stabilizing compound is a polymer containing an amide functional group.

20. The process of claim 19 wherein the amide functional group is selected from the group consisting of aliphatic or aromatic amides.

21. The process of claim 14 wherein the melt stable, organic nitrogen-containing stabilizing compound is a polymer containing an amine functional group.

22. The process of claim 21 wherein the amine functional group is selected from the group consisting of aliphatic or aromatic, primary, secondary and tertiary amines.

23. The process of claim 14 wherein the melt stable, organic nitrogen-containing stabilizing compound is selected from the group consisting of nylon 6, nylon 4,6, nylon 6,6, nylon 6,10, nylon 6,12, nylon 12,12, or their copolymers and blends.

24. The process of claim 14 wherein the melt stable, organic nitrogen-containing stabilizing compound is selected from the group consisting of poly(p-phenylene terephthalamide) and poly(m-phenylene isophthalamide).

25. The process of claim 14 wherein the melt stable, organic nitrogen-containing stabilizing compound is a polyamide prepared from bis(hexamthylenetriamine).

26. The process of claim 14 wherein the fibers are monocomponent fibers.

27. The process of claim 14 wherein the fibers are bicomponent fibers comprising as one component the 3-hydroxypropanoxy terminated polymer and as the other component the polyethylene terephthalate, wherein the 3-hydroxypropanoxy terminated polymer is poly(trimethylene terephthalate).

28. The process of claim, 14 wherein the 3-hydroxypropanoxy terminated polymer is selected from the group consisting of poly(trimethylene terephthalate, poly(trimethylene naphthalenedicarboxylate), poly(trimethylene isophthalate) and blends and copolymers thereof.

29. The process of claim 14 wherein the 3-hydroxypropanoxy terminated polymer is poly(trimethylene terephthalate) and copolymers thereof.

30. A process of preparing fibers from poly(trimethylene terephthalate) or copolymers thereof comprising:
   a) providing a molten blend of polymers comprising said poly(trimethylene terephthalate) polymer or copolymer, and providing about 0.01% to about 10%, by weight of the poly(trimethylene terephthalate) polymer or copolymer, of molten melt stable polyamine or polyamide stabilizing polymer to reduce the emission of acrolein from the poly(trimethylene terephthalate) polymer or copolymer, and
   b) spinning the blend of polymers into fibers.

* * * * *